US010611624B2

(12) United States Patent
Néron

(10) Patent No.: US 10,611,624 B2
(45) Date of Patent: Apr. 7, 2020

(54) METHOD AND APPARATUS FOR MEASURED LIQUID DISPENSING

(71) Applicant: CRISTAL INNOVATION INC., Saint-Bruno-de-Montarville, QC (CA)

(72) Inventor: Pierre Néron, St-Bruno (CA)

(73) Assignee: CRISTAL INNOVATION INC., Saint-Bruno-de-Montarville (CA)

( * ) Notice: Subject to any disclaimer, the term of this patent is extended or adjusted under 35 U.S.C. 154(b) by 260 days.

(21) Appl. No.: 15/758,391

(22) PCT Filed: Sep. 8, 2016

(86) PCT No.: PCT/CA2016/051055
§ 371 (c)(1),
(2) Date: Mar. 8, 2018

(87) PCT Pub. No.: WO2017/041170
PCT Pub. Date: Mar. 16, 2017

(65) Prior Publication Data
US 2018/0265346 A1 Sep. 20, 2018

Related U.S. Application Data

(60) Provisional application No. 62/215,336, filed on Sep. 8, 2015.

(51) Int. Cl.
*B67D 7/14* (2010.01)
*B67D 7/02* (2010.01)
(Continued)

(52) U.S. Cl.
CPC .............. *B67D 7/145* (2013.01); *B67D 7/02* (2013.01); *B67D 7/0294* (2013.01); *B67D 7/20* (2013.01);
(Continued)

(58) Field of Classification Search
CPC .......... B67D 7/145; B67D 7/20; B67D 7/222; B67D 7/36; B67D 7/02; B67D 7/0294;
(Continued)

(56) References Cited

U.S. PATENT DOCUMENTS 5,222,027 A * 6/1993 Williams ............... B67D 7/744
222/1
7,028,561 B2 4/2006 Robertson
(Continued)

OTHER PUBLICATIONS

International Search Report from PCT/2016/051055 from international phase of the PCT.

*Primary Examiner* — Michael Collins
(74) *Attorney, Agent, or Firm* — Benoit Yelle; Gowling WLG (Canada) LLP

(57) ABSTRACT

Method and system for measured dispending of a liquid to a target reservoir. An oval gear flow meter provides two pulses from different magnets. A pipe subsystem allows liquid from an above-ground reservoir measured through the oval gear flow meter to be controllably dispensed using a controllable valve. A processor module, upon receipt of a start-signal, opens the controllable valve and, until receipt of a stop-signal, computes a volume of the liquid dispensed by the system into the target reservoir by counting the pulses as a first and second counts. An adjustable volume-per-count value is computed with the count(s) to obtain the volume of liquid dispensed. The processor generates an error when a difference between the two counts is greater than a predetermined threshold set considering a target precision setting for the dispensing system.

26 Claims, 7 Drawing Sheets

(51) Int. Cl.
  *B67D 7/20* (2010.01)
  *B67D 7/36* (2010.01)
  *G01F 3/10* (2006.01)
  *B67D 7/22* (2010.01)
  *G01F 25/00* (2006.01)
  *B67D 7/34* (2010.01)
  *B67D 7/44* (2010.01)
  *B67D 7/46* (2010.01)

(52) U.S. Cl.
  CPC ............... *B67D 7/222* (2013.01); *B67D 7/36* (2013.01); *G01F 3/10* (2013.01); *G01F 25/0007* (2013.01); *B67D 7/34* (2013.01); *B67D 7/44* (2013.01); *B67D 7/46* (2013.01)

(58) Field of Classification Search
  CPC .... B67D 7/34; B67D 7/44; B67D 7/46; G01F 3/10; G01F 25/0007
  USPC .................................................. 700/231–244
  See application file for complete search history.

(56) References Cited

U.S. PATENT DOCUMENTS

| | | | |
|---|---|---|---|
| 7,660,648 B2* | 2/2010 | Dykstra | B01F 15/00207 366/16 |
| 2005/0028610 A1 | 2/2005 | Olivier | |
| 2007/0093936 A1* | 4/2007 | Johnson | F25D 23/126 700/240 |
| 2010/0199758 A1 | 8/2010 | Tokhtuev | |
| 2010/0258587 A1 | 10/2010 | Wheeler | |
| 2018/0265346 A1* | 9/2018 | Neron | B67D 7/20 |

* cited by examiner

1000

Two square waves in quadrature

METHOD AND APPARATUS FOR MEASURED LIQUID DISPENSING

CROSS REFERENCE TO RELATED APPLICATIONS

The present non-provisional patent application is a U.S. National Phase of International Patent Application PCT/CA2016/051055, filed Sep. 8, 2016, which is hereby incorporated by reference in its entirety and which claims priority based upon the prior U.S. provisional patent application entitled "METHOD AND APPARATUS FOR MEASURED LIQUID DISPENSING", application No. 62/215,336, filed Sep. 8, 2015, in the name of NERON, Pierre, which is herein incorporated by reference in its entirety.

TECHNICAL FIELD

The present invention relates to liquid dispensing from a fixed reservoir and, more particularly, to measured liquid dispensing directly to a consumer recipient.

BACKGROUND

When comes time to fill up the windshield washer tank in a vehicle, people typically buy or use previously bought 1-gallon (3.78l or about 4-liter) recipients. Some mechanics will also fill their customer windshield washer tank during an oil change or another visit to their garage.

No solution exists that would allow self-service of windshield washer liquid by a consumer from an independent vending system that can sell the liquid by volume.

The present invention addresses this shortcoming.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present invention is directed to a system for measured dispending of a liquid to a target reservoir external to the system. The system comprises an oval gear flow meter, a controllable valve, a pipe subsystem and a processor module. The oval gear flow meter provides a first pulse from a first magnet of the oval gear flow meter and a second pulse from a second magnet of the oval gear flow meter. The pipe subsystem connects an above-ground reservoir to the oval gear flow meter and the controllable valve. The pipe subsystem allows liquid from the above-ground reservoir measured through the oval gear flow meter to be controllably dispensed into the target reservoir using the controllable valve. The processor module is for executing instructions stored on a non-transitional readable medium for causing the processor to, upon receipt of a start-signal to start dispensing of the liquid into the target reservoir, open the controllable valve and, until receipt of a stop-signal to stop dispensing of the liquid into the target reservoir, compute a volume of the liquid dispensed by the system into the target reservoir by counting the first pulse as a first count and by counting the second pulse as a second count. At least one of the first count and the second count is computed with an adjustable volume-per-count value to obtain the volume of liquid dispensed into the target reservoir. The adjustable volume-per-count value is set for the dispensing system from characteristic of the oval gear flow meter. The instructions stored on the non-transitional readable medium are also for causing the processor to generate an error when a difference between the first count for the first pulse and the second count for the second pulse is, in absolute value, greater than a predetermined threshold. The predetermined threshold is set considering a target precision setting for the dispensing system.

In an optional embodiment, the system is provided in a stand-alone enclosure comprising the above ground reservoir.

Optionally, the processor module may further comprise a first circuit board performing metrologic computations of the volume of liquid dispensed into the target reservoir and a second circuit board in communication with the first circuit board controlling the controllable valve.

The system may also further comprising a nozzle of the pipe subsystem for dispensing the measured liquid into the target reservoir. The second circuit board in communication with the first circuit board may be connected to the nozzle and may receive the start-signal and the stop-signal therefrom. The nozzle may optionally comprise an air penetration hole dimensioned to auto-stop dispending of the liquid for a flow rate between 1 liter per minute and 8 liters per minute. For instance, the air penetration hole may be no larger than 1 mm, preferably between 0.5 mm and 1 mm.

In an optional embodiment, the system further comprises a payment subsystem for vending to a consumer the volume of liquid dispensed into the target reservoir. The system may also further comprise a network interface for receiving authorization of the vending of the volume to the consumer from a remote financial payment management provider. The second circuit board in communication with the first circuit board may be connected to the payment subsystem and the network interface. The instructions stored on the non-transitional readable medium may further be for further causing the processor to, after computing of the volume of the liquid dispensed by the system into the target reservoir, at the first circuit board, compute a cost for the vending of the volume to the consumer considering a price per unit of volume for the dispensed liquid and, at the second circuit board, send a message through the network interface towards the financial payment management provider comprising the cost for the vending of the volume to the consumer.

The pipe subsystem may optionally comprise a unidirectional valve for avoiding undue liquid displacement therein upon stop of the dispensing of the liquid.

The system may further optionally comprise a pressure sensor for evaluating a remaining volume in the above-ground reservoir, the instructions stored on the non-transitional readable medium being for further causing the processor to, when the remaining volume is lower than or equal to a predetermined threshold evaluated volume, prevent subsequent operation of the system until the remaining volume above the predetermined threshold evaluated volume. When the remaining volume crosses the predetermined threshold evaluated volume during dispensing of the liquid into the target reservoir, the ongoing dispending transaction may be completed before preventing the subsequent operation of the system. When the remaining volume crosses the predetermined threshold evaluated volume, a message may optionally be sent through the network interface to a remote refill management subsystem.

A second aspect of the present invention is directed to a method for measured dispending of a liquid from a system into a target reservoir external to the system. The method comprises executing instructions stored on a non-transitional readable medium at a processor module for, upon receipt of a start-signal to start dispensing of the liquid into the target reservoir, opening a controllable valve, causing liquid to flow through oval gear flow meter providing a first pulse and a second pulse to the processor and, until receipt of a stop-signal to stop dispensing of the liquid into the target reservoir, computing a volume of the liquid dispensed into the target reservoir by counting the first pulse as a first count and by counting the second pulse as a second count. At least one of the first count and the second count is computed with an adjustable volume-per-count value to obtain the volume of liquid dispensed into the target reservoir and the adjustable volume-per-count value being set from characteristic of the oval gear flow meter. The method also comprises generating an error when a difference between the first count for the first pulse and the second count for the second pulse is, in absolute value, greater than a predetermined threshold, the predetermined threshold being set considering a target precision setting.

The method may optionally be executed in a stand-alone enclosure comprising the above ground reservoir.

The metrologic computations of the volume of liquid dispensed into the target reservoir may optionally be performed at first circuit board and controlling of the controllable valve may be performed at a second circuit board in communication with the first circuit board.

The method may further comprise dispensing of the liquid into the target reservoir through a nozzle of a pipe subsystem. The method may then optionally further comprise receiving the start-signal from the nozzle and receiving the stop-signal from the nozzle. The method may also optionally comprise auto-stopping the dispensing though the nozzle when air pressure from an air penetration hole reaches a threshold value, the air penetration hole being dimensioned for a flow rate between 1 liter per minute and 8 liters per minute. For instance, the air penetration hole may be no larger than 1 mm, preferably between 0.5 mm and 1 mm.

Optionally, the method may further comprise vending a consumer the volume of liquid dispensed into the target reservoir via a payment subsystem. the method may then optionally comprise receiving authorization of the vending of the volume to the consumer from a remote financial payment management provider, computing a cost for the vending of the volume to the consumer considering a price per unit of volume for the dispensed liquid and sending a message towards the financial payment management provider comprising the cost for the vending of the volume to the consumer.

The method may also optionally further comprise avoiding undue liquid displacement therein upon stopping of the dispensing of the liquid by providing a unidirectional valve.

In some embodiments, the method further comprises evaluating a remaining volume in the above-ground reservoir and, when the remaining volume is lower than or equal to a predetermined threshold evaluated volume, preventing subsequent operation of the system until the remaining volume above the predetermined threshold evaluated volume. When the remaining volume crosses the predetermined threshold evaluated volume during dispensing of the liquid into the target reservoir, the method may comprise completing the ongoing dispending before preventing the subsequent operation of the system. When the remaining volume crosses the predetermined threshold evaluated volume, the method may also comprise, alternatively or in addition, sending a message to a remote refill management subsystem.

BRIEF DESCRIPTION OF THE DRAWINGS

Further features and exemplary advantages of the present invention will become apparent from the following detailed description, taken in conjunction with the appended drawings, in which.

DETAILED DESCRIPTION

The present invention is directed to systems and methods for measured liquid dispensing to a consumer recipient from an independent vending system. In the preferred embodiment, the liquid is dispensed from a fixed above-ground reservoir integrally provided with the system (i.e., as a standalone system and/or turnkey solution for vending of the liquid). In the preferred embodiment, a transaction system and a dispensing system of the vending system are provided together. The reservoir may be juxtaposed to the transaction system and the dispensing system or may be provided away therefrom. The present invention is concerned with measured liquid dispending of liquid from an above-ground reservoir such as windshield washer liquid and may further be adapted for dispensing different liquids such as oil, coolant or other automotive-related liquids apart from gasoline. Other liquids related to other industries (e.g., food and drugs) could also be dispensed from a system adapted therefor considering the teachings of the present invention. Controlled precision and reliability of the system and method are crucial in many cases considering regulatory requirements applicable to the direct sale of liquid from an automated system (e.g., applied by one or more government instances for the protection of the consumers). The system and method presented herein in accordance with some embodiments have proved to be precise and reliable enough to meet at least one set of regulatory requirements.

Figure 1:
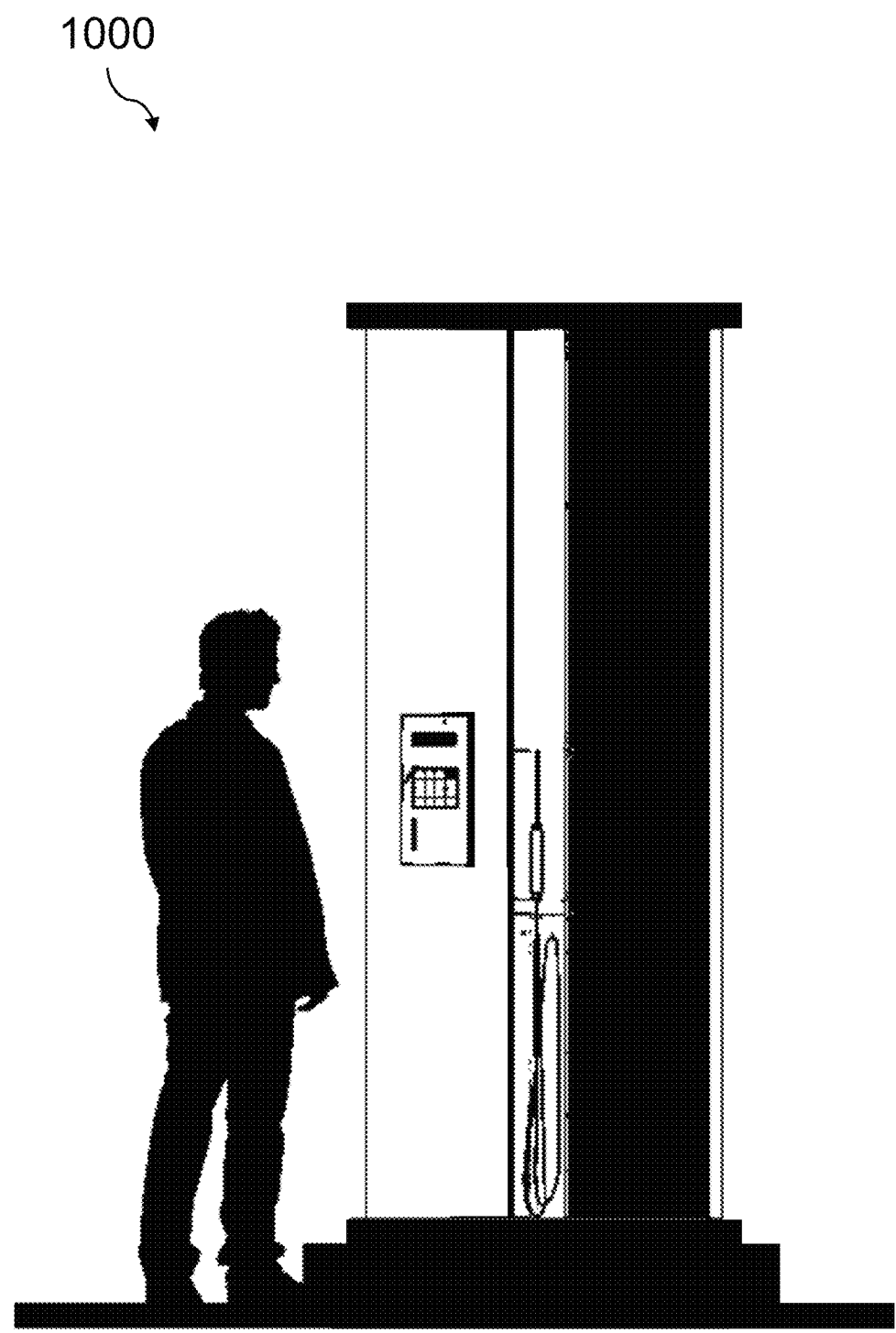
FIG. 1 is an elevation view of an exemplary independent dispensing and vending system in accordance with one embodiment.
Figure 2:
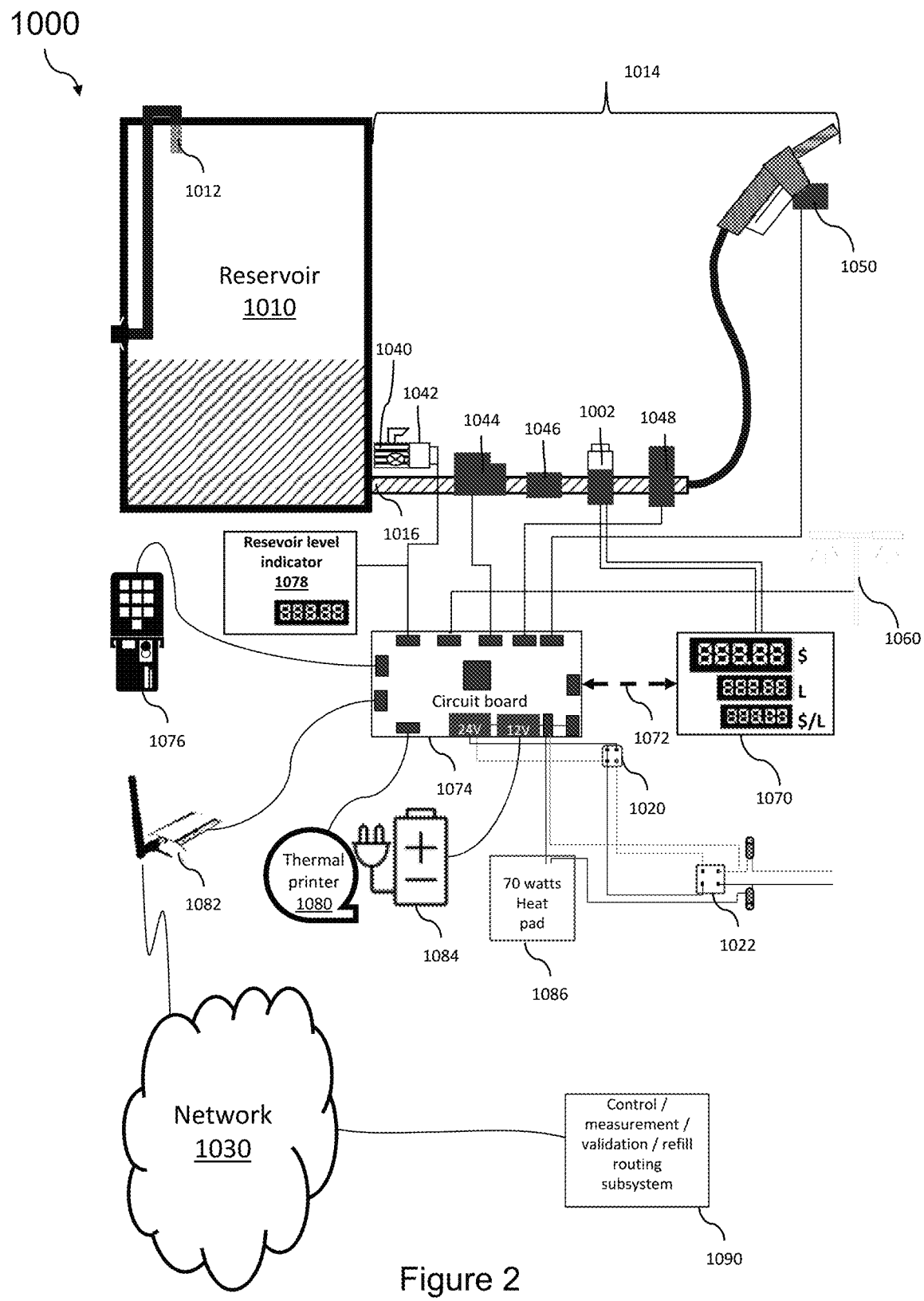
FIG. 2 is a logical and modular view of the exemplary independent vending system in accordance with one embodiment.
Figure 3A:
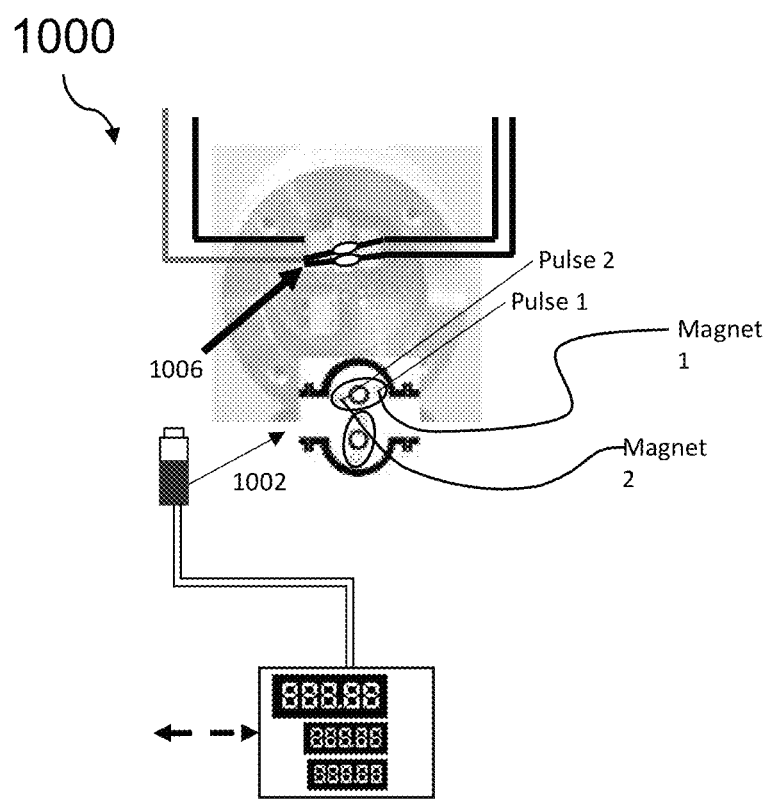
FIGS. 3A and 3B, together referred to as FIG. 3, are a logical and modular views of an exemplary flow meter in accordance with one embodiment.
Figure 3B:
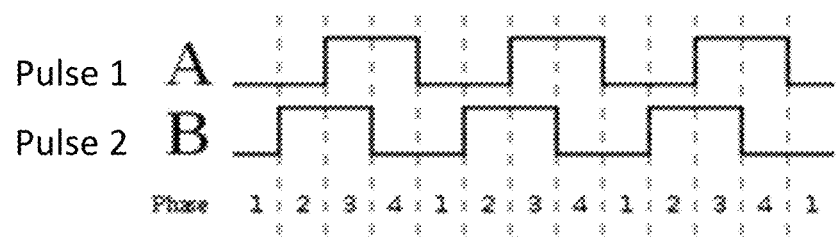
Figure 4:
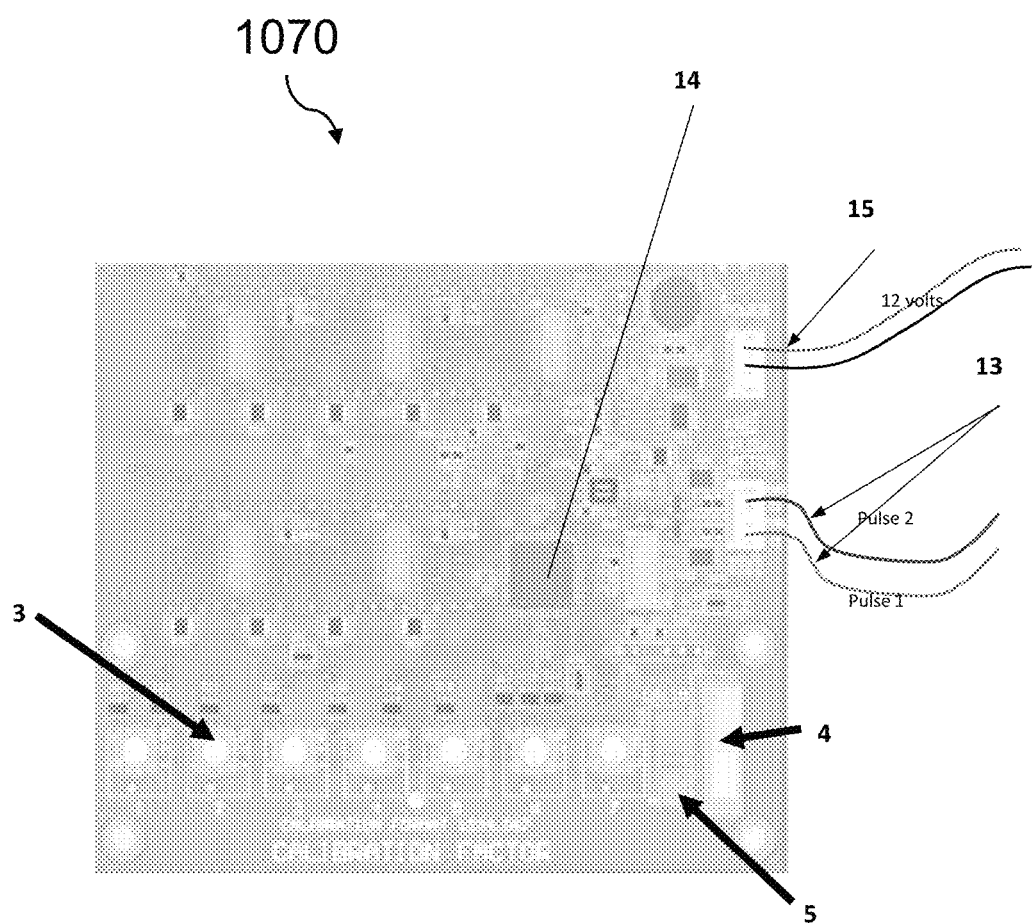
FIG. 4 is a logical and modular view of a display board in accordance with one embodiment.
Figure 5:
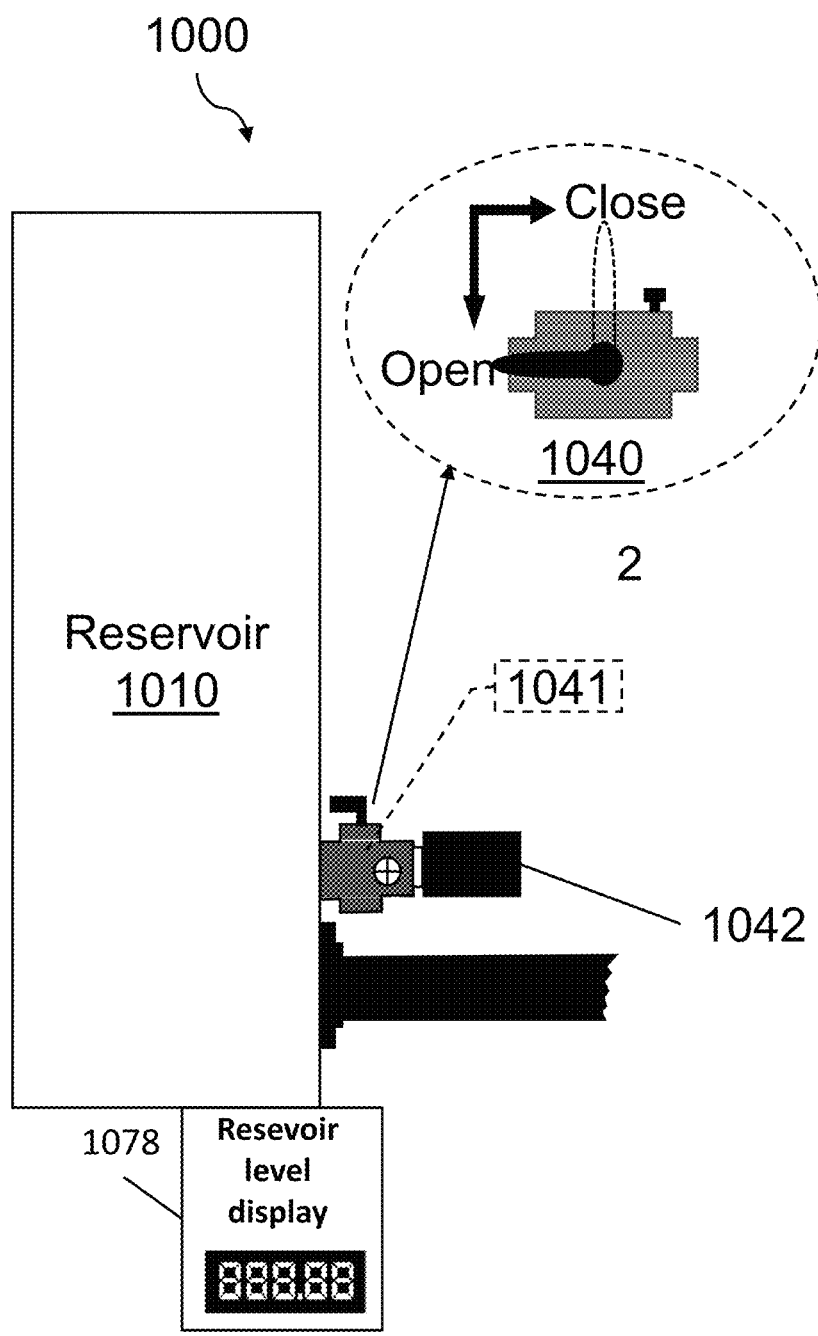
FIG. 5 is a logical and modular view of an exemplary valve system in accordance with one embodiment.
Figure 6:
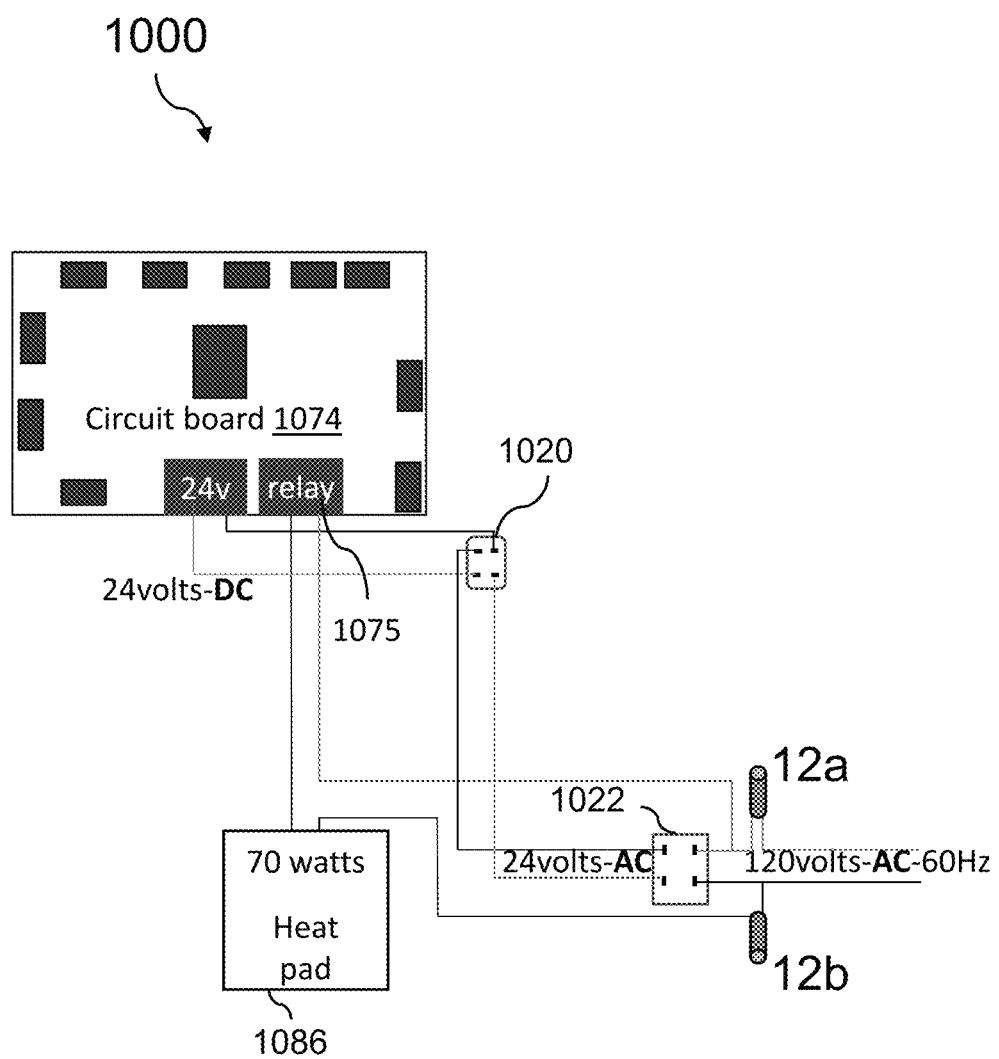
FIG. 6 is a logical and modular view of an exemplary power supply and circuit board in accordance with one embodiment.
Figure 7:
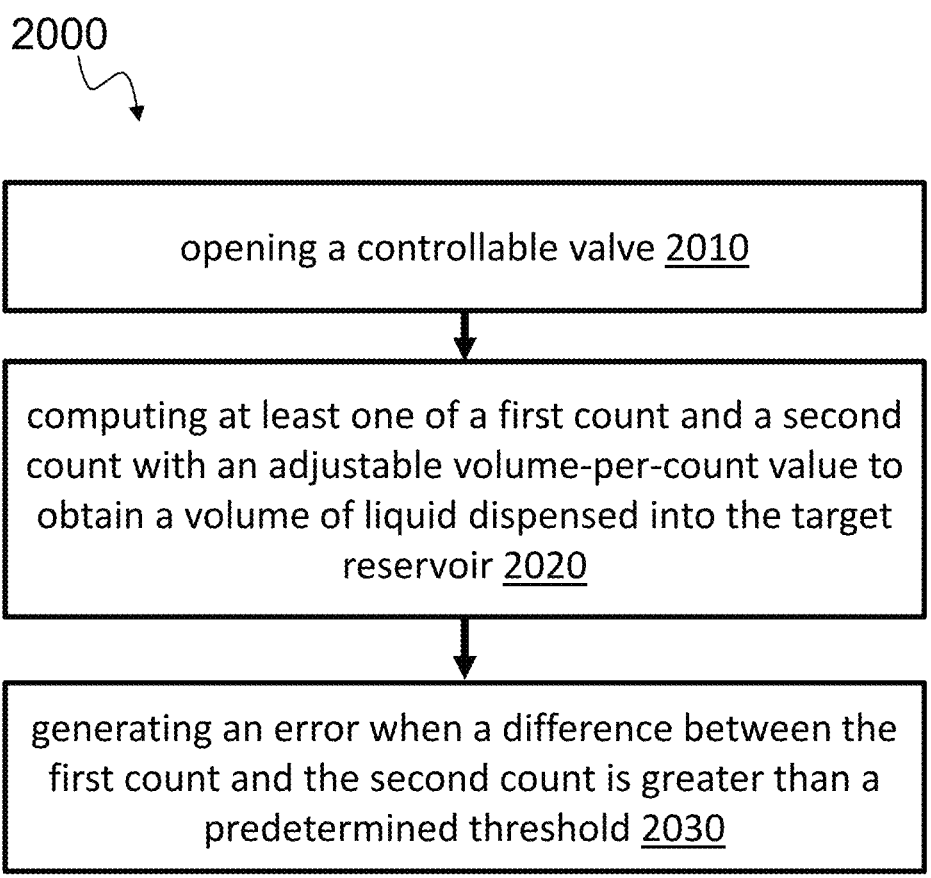
FIG. 7 is a flow chart of a method for dispending liquid in accordance with one embodiment.

Reference is now made to concurrently to FIG. 1 to FIG. 7 of the drawings. A system 1000 for measured liquid dispensing is provided. Different features of the system 1000 and a corresponding method 2000 are discussed hereinbelow. The system 1000 comprises an above-ground reservoir 1010 that contains, for instance, windshield washer fluid. A refill (or intake) pipe 1012 allows to fill in the reservoir. A pipe subsystem 1014 comprises a pipe 1016, a control nozzle 1050 and various elements 1002, 1040, 1041, 1042, 1044, 1046 and 1048 in between for controllably and measurably dispensing liquid from the reservoir 1010 (which elements of the pipe subsystem 1014 may further be reordered therealong by the skilled person without affecting the teachings of the present invention). More specifically, in the depicted example, a ball valve 1040 with a purge 1041 is provided next to a pressure sensor 1042. The elements 1040, 1041 and 1042 allow for evaluating liquid remaining in the reservoir 1010 and calibration/validation of the pressure sensor 1042 as will be better understood hereinbelow. The elements 1040, 1041 and 1042 are associated with the pipe subsystem 1014, but skilled person will readily understand that this is done simply for clarity of presentation.

The pipe subsystem 1014 comprises a contactless pump 1044 for pumping the liquid from the reservoir 1010 towards the nozzle 1050. The pump 1044 is not used, in the system 1000, to measure volume. The pipe subsystem 1014 also comprises a check valve 1046. In the depicted example, the check valve 1046 allows flow in a single direction, as safety feature and to ensure no return of liquid (e.g., when the nozzle 150 is suddenly stopped to reduce or eliminate liquid oscillation). The pipe subsystem 1014 then comprises an oval gear flow meter 1002 that provides a pulse 13 and a solenoid valve 1048 that controllably allows liquid to be dispensed through the nozzle 1050.

In the depicted example, the system 1000 also comprises a display and metrologic circuit board 1070 connected (e.g., via a serial connection 1072) to a control circuit board 1074. The control circuit board 1074 selectively receives power from a backup battery 1084 (e.g., 12V, 5 Ah) and a one more DC transformers 1020/1024. The control circuit board 1074 allows the system to also control an LED lighting subsystem 1060, a payment subsystem 1076, a reservoir level indicator 1078, a thermal printer 1080 and a heat pad 1086.

The system 1000 also comprises a network communication subsystem 1082 allowing communications through a network 1030 towards a Control/measurement/validation/refill routing subsystem 1090.

The method 2000 is for measured dispending of a liquid to a target reservoir external to the system 1000. The method is executed at one or more processors from instructions stored on a non-transitional readable medium. Upon receipt of a start-signal to start dispensing of the liquid into the target reservoir (e.g., from the nozzle 1050), the controllable valve 1078 is opened 2010, causing liquid to flow through oval gear flow meter 1002 providing a first pulse and a second pulse 13 to the processor(s). Until receipt of a stop-signal to stop dispensing of the liquid into the target reservoir (e.g., from the nozzle 1050 or the circuit board 1074), the processor(s) computes 2020 a volume of the liquid dispensed into the target reservoir by counting the first pulse as a first count and by counting the second pulse as a second count. At least one of the first count and the second count are computed 2020 with an adjustable volume-per-count value to obtain the volume of liquid dispensed into the target reservoir. The adjustable volume-per-count value may be set from characteristic of the oval gear flow meter 1002. The method 2000 also comprises generating 2030 an error when a difference between the first count for the first pulse and the second count for the second pulse is, in absolute value, greater than a predetermined threshold. The predetermined threshold may be set considering a target precision setting (as a fixed value or an adjustable value).

Details of the different elements and subsystems of the system 1000 and associated method 2000 are provided hereinbelow.

Oval Gear Flow Meter 1002 Using Quadrature Reading

The oval gear flow meter 1002 allows the use of the quadrature reading, usually used for reading the flow direction, but used in the context of the depicted example for the purpose of measuring the volume of liquid dispensed therethrough. The 2-pulse output 13 from the oval gear flow meter 1002 is also used for redundancy. The check valve 1046 mounted on the pipe subsystem 1014 is also used for preventing reverse flow. The system 1000, through the 2-pulse output, 13, can measure liquid dispensing in a redundant manner and, as needed may interrupt delivery when a number of pulses (e.g., 4 pulses) differ from one another. In a preferred embodiment, the system 1000 may be configured to indicate an error and to prevent delivery until the error is fixed. In one embodiment, each pulse represents 0.708600 milliliter of liquid. As such, 1 liter requires 708.600 pulses output (corresponding to a K factor). The K factor is an adjustable volume-per-count value. The precision obtained during initial testing is 0.5%.

The oval gear flow meter 1002 provides a quadrature, which has two output channels using Hall-effect signal, with repeating square waves, which are out of phase by 90 electrical degrees from the phase difference. The rotor turns with the shaft and contains alternating evenly spaced north and south poles around its circumference. The sensor detects these small shifts in the position N>>S and S>>N. The sensors work by detecting a change in voltage by magnetic deflection of electrons.

In the preferred embodiment, each of the 2-pulse output 13 is wired individually and may therefore be individually disconnected from the display and metrologic board 1070, e.g., to verify that the redundancy is functioning properly. In order to do so, in one embodiment, a sealable plate mounted on the board needs to be removed and a switch 5 need to be on calibration mode to perform such verification.

In the preferred embodiment, the volumetric calculation is embedded into a processor 14 on the display and metrologic board 1070 and the information is transferred to the control board 1074 via a serial connection 1072. Also, on the display and metrologic board 1070 are mounted 7 numbered knobs 3 for adjusting the K factor (0708.600). The K factor may be set for the system 1000 from characteristic of the oval gear flow meter 1002, thereby allowing relevant authority (e.g., calibration and measure authority) to change it, e.g., according to their calibration methods and to test and/or approve the system 1000.

In the preferred embodiment, a sealable plate is mounted on the back of the display and metrologic board 1070, preventing tampering of the K factor unless the plate is removed. The display and metrologic board 1070 may further be equipped with a security temper switch 4 interrupting any transaction to be made since removing the plate will automatically activate the switch 4. When the sealable plate is removed, delivery is only possible when the calibration switch 5 is activated and put on the "CALIB" mode. This may be required, for instance, for the relevant authority to run their calibration test (e.g., for a period of 30 minutes). To return to the transaction mode, the sealable plate needs to be on and the switch 5 back to normal ("NORM").

In the preferred embodiment, the oval gear flow meter 1002 is powered from the display and metrologic board 1070 on 12 Volts Direct Current (VDC) 15. It is only when powered that quadrature pulse signals 13 can be obtained. If not powered, no signal is provided by the oval gear flow meter 1002. Delivery is still technically possible (for instance, delivery may continue if the transaction is already accepted (e.g., credit card okayed)). In order to get a signal indicating that power is on, 2 resistors 1006 of 1 k may be used, connecting the power (+) to each pulse. If power is disconnected, the pump 1044 and the solenoid 1048 will close and/or will not start.

Pressure Sensor 1042 for Liquid Level Indication into The Reservoir 1010 and Sensor Functionality Verification In the preferred embodiment, the system 1000 is equipped with a pressure sensor 1042 (−40° C. or −0° F. resistant), 12V powered giving a 0V to 5V reading. This allows precise verification of the liquid level in the reservoir 1010. The reading is sent to the main board 1074. The system 1000 may be configured to allow a last transaction when it reaches a certain threshold (e.g., 100 liters from an empty reservoir). Each transaction may have a maximum delivery amount (e.g., of approximately $54 which represent about 43 liters at a price of $1.255/liter or about 11.4 gallons at a price of $4.737/gallon). The system 1000 may further allow any transaction when the pressure sensor 1042 indicates no less than a predetermined threshold evaluated volume (e.g., 80 liters (about 21 gallons), 50 liters (about 13 gallons), etc.) left in the reservoir 1010. The predetermined threshold evaluated volume allows sufficient liquid to complete a transaction, which both protects the customer and prevents air (or the like) from entering the system 1000 through the nozzle 150.

In real time processing priority, the system 1000 may also send the information to a digital display 1078, installed close to the refill pipe entry so the amount left in the reservoir 1010 can be verified and refill volume can be counter checked.

In the preferred embodiment, a method has been developed for verification and assurance that the sensor 1042 is powered and properly functioning, which comprises:

1—Close the ball valve 1040 (handle perpendicular to the valve).
2—Slightly unscrew the «purge» 1041.
3—Check that the system 1000 indicates an error (e.g., «out of order» «err 04»).
4—If so screw back the purge 1041.
5—Re-open the ball valve 1040 (handle parallel to the ball valve).
6—Check if the system error is not showing and that the system 1000 is back to normal.

Network Connectivity (E.g., Cellular Modem Communication)

The system 1000 may be equipped with network connectivity 1082, such as a cellular modem, not only to communicate with the financial payment management provider, but also to communicate with management server(s) 1090. The management server(s) 1090 may represent one or more physical servers located at a management premise or may represent one or more logical servers, e.g. hosted by a cloud service provider. The following information may be sent to, and processed by, the management server(s):

1—The liquid level into the reservoir 1010. This may further allow for delivery route planning (e.g., where levels are close to critical low levels). Delivery route planning may which may further consider average usage per day per location, expected weather conditions near a location or near a highway, seasonal usage, etc.
2—Board temperature, which may be used to plan routine and emergency maintenance operation(s).
3—Transaction status, date, time, quantity delivered, location, pump number, price per liter, which may be used to compute margins, profits, habits, etc.
4—System mode: e.g., calibration or normal mode, which may be used to track health status and calibration status of the systems, etc.
5—Any system error (which may be used to plan routine and emergency maintenance operation(s)) such as:
  a. Near end paper into the printer or out of paper;
  b. Out of service due to low liquid into the reservoir "error 4";
  c. Missing pulse "error 1";
  d. Intrusion error, temper switch off but still on calibration ("calib") mode or vice versa; and/or
  e. Other important data that can remotely be useful.

System Operating at +40° C. to −30° C. (104° F. to −22° F.)

In the preferred embodiment, the system 1000 resists as per agreed standards at operational temperature of +40° C. and −30° C. (104° F. and −22° F.). During initial testing, the system 1000 was successfully tested at +40° C./+20° C. and −30° C. (104° F./68° F. and −22° F.) against the standards.

Among other characteristics, the preferred embodiment comprises a printer 1080 that can deliver a receipt after each transaction. A thermal printer device 1080 is provided with the preferred embodiment, which has an operational temperature range of +70° C. to −20° C. (158° F. to −4° F.). Therefore, a silicon heating pad has been added inside the enclosure in the preferred embodiment. The main electronic board is further equipped with a temperature sensor (not shown) that measures the temperature inside the enclosure. When the enclosure reaches a certain threshold (e.g., −8° C. or about 18° F.), the system 1000 may send current to the heating pad 1086 until the temperature sensor reads above another threshold (e.g., −5° C. or 23° F.), at what point the system 1000 stops the current to the heating pad 1086. This process may of course be repeated as long as the temperature keeps is below the desired threshold.

Emergency Battery

For better managing event such as power lost, the system 1000 may be equipped with an emergency battery 1084. In the preferred embodiment, a 12 Volts (V)-5 Ampere (A) battery 1084 is provided, e.g., to ensure that a currently undertaken transaction can be completed. The emergency battery 1084 may further be used to keep the display ON (e.g., for a minimum of 24 hours or until the emergency battery reaches its maximum download level).

When the power is restored, the battery 1084 may then be recharged back to its maximum level by the power supply 1020/1022 and/or through a power supply (not shown) of the main board 1074.

Power Supply

In the preferred embodiment, the incoming grid power (e.g., 120V, but the system 1000 may also be adapted to different system(s)) is going through a 24 Volts Alternating Current (VAC)-5 Ampere-hour (Ah) converter 1022. The 24 VAC is directed into a diode bridge 1020 to transform the 24 VAC into a 24 VDC which then goes into the circuit board 1074. The circuit board power supply transforms the 24 VDC-5 Ah into 12 VDC-10 Ah, which powers all components working on 12 VDC. The heat pad 1086 has 1 wire connected directly on the 120 VAC coming from the fuse 12b and the other wire connected into the relay on the circuit board 1074. The live wire is connected into a relay 1075 coming from in-between the fuse (12a) and the 24 V transformer 1024. The relay 1075 is activated by the circuit board 1074 when the temperature sensor reaches the threshold (e.g., −8° C. or about 18° F.).

A procedure may be provided to verify the metrologic micro program (or firmware) version stored in the circuit board 1074 and/or the display and metrologic board 1070. A switch may be put on the off position and the emergency battery 1084 disconnected. When the switch is turned back on, a micro program version will be displayed for a short period of time on the front display of the display and metrologic board 1070.

12 V Contactless Pump 1044

In the preferred embodiment, the system 1000 includes a 12 V contactless pump 1044 using an electro-magnetic field which can deliver 15 liters per minute (or 4 gallons per minutes), has an 8-meter (about 26-foot) maximum hydraulic head (or water head) using 36 watts. The electro-magnetic field or contactless can operate under arch condition such as the one required for expected operations of the system 1000. The operating condition tested is −30° C. and +40° C. (−22° F. to 104° F.).

12 V Solenoid Valve 1048

The system 1000 includes a 12 V solenoid valve 1048 that can sustain an operating condition of −40° C. and +70° C. (−40° F. and 158° F.) using very low wattage (e.g., 1.2 watts). It is normally closed and needs to be powered to open.

Auto-stop Nozzle Sensitivity

In some embodiments, the system 1000 includes an auto-stop nozzle 150 to prevent overflow. The nozzle auto-stop mechanism is modified, as compared to a conventional nozzle used for gasoline distribution, to augment its sensitivity. Such modification consist of reducing the air entry into the nozzle mechanism by diminishing the diameter of an air penetration hole from 3 mm (about 1/8") down to between 0.5 mm and 1 mm (about 0.197" and 0.394"). Such reduction of the air penetration hole allows the auto-stop to work properly, in the test performed, for a flow rate between 1 liter (about 1/4 gallon) per minute and 8 liters (about 2 gallons) per minute. Skilled persons will understand that the air penetration hole may be dimensioned differently considering the target flow rate of the system 1000.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The present invention is not affected by the way the different modules exchange information between them. For instance, parallel bus(es) and/or a serial connection(s) may be used and may further involve module(s) (not necessarily shown) without affecting the teachings of the present invention.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A system for measured dispending of a liquid to a target reservoir external to the system, the system comprising:
    an oval gear flow meter providing a first pulse from a first magnet of the oval gear flow meter and a second pulse from a second magnet of the oval gear flow meter;
    a controllable valve;
    a pipe subsystem connecting an above-ground reservoir to the oval gear flow meter and the controllable valve, the pipe subsystem allowing liquid from the above-ground reservoir measured through the oval gear flow meter to be controllably dispensed into the target reservoir using the controllable valve; and
    a processor module for executing instructions stored on a non-transitional readable medium for causing the processor to:
        upon receipt of a start-signal to start dispensing of the liquid into the target reservoir, open the controllable valve;
        until receipt of a stop-signal to stop dispensing of the liquid into the target reservoir, compute a volume of the liquid dispensed by the system into the target reservoir by counting the first pulse as a first count and by counting the second pulse as a second count, at least one of the first count and the second count being computed with an adjustable volume-per-count value to obtain the volume of liquid dispensed into the target reservoir, the adjustable volume-per-count value being set for the dispensing system from characteristic of the oval gear flow meter; and
        generate an error when a difference between the first count for the first pulse and the second count for the second pulse is, in absolute value, greater than a predetermined threshold, the predetermined threshold being set considering a target precision setting for the dispensing system.

2. The system of claim 1 provided in a stand-alone enclosure comprising the above ground reservoir.

3. The system of claim 1, wherein the processor module further comprises:
    a first circuit board performing metrologic computations of the volume of liquid dispensed into the target reservoir; and
    a second circuit board in communication with the first circuit board controlling the controllable valve.

4. The system of claim 3, further comprising a nozzle of the pipe subsystem dispensing the measured liquid into the target reservoir.

5. The system of claim 4, wherein the second circuit board in communication with the first circuit board is connected to the nozzle and receives the start-signal and the stop-signal therefrom.

6. The system of claim 4, wherein the nozzle comprises an air penetration hole dimensioned to auto-stop dispending of the liquid for a flow rate between 1 liter per minute and 8 liters per minute.

7. The system of claim 6, wherein the air penetration hole is no larger than 1 mm.

8. The system of claim 3, further comprising a payment subsystem for vending to a consumer the volume of liquid dispensed into the target reservoir.

9. The system of claim 8, further comprising a network interface for receiving authorization of the vending of the volume to the consumer from a remote financial payment management provider, wherein the second circuit board in communication with the first circuit board is connected to the payment subsystem and the network interface, the instructions stored on a non-transitional readable medium being for further causing the processor to:
    after computing of the volume of the liquid dispensed by the system into the target reservoir, at the first circuit board, compute a cost for the vending of the volume to the consumer considering a price per unit of volume for the dispensed liquid; and
    at the second circuit board, send a message through the network interface towards the financial payment management provider comprising the cost for the vending of the volume to the consumer.

10. The system of claim 1, wherein the pipe subsystem comprises a unidirectional valve for avoiding undue liquid displacement therein upon stop of the dispensing of the liquid.

11. The system of claim 1, further comprising a pressure sensor for evaluating a remaining volume in the above-ground reservoir, the instructions stored on the non-transitional readable medium being for further causing the processor to:
when the remaining volume is lower than or equal to a predetermined threshold evaluated volume, prevent subsequent operation of the system until the remaining volume above the predetermined threshold evaluated volume.

12. The system of claim 11, wherein the instructions stored on the non-transitional readable medium are for further causing the processor to:
when the remaining volume crosses the predetermined threshold evaluated volume during dispensing of the liquid into the target reservoir, complete the ongoing dispending before preventing the subsequent operation of the system.

13. The system of claim 11, further comprising a network interface for receiving authorization of the vending of the volume to the consumer from a remote financial payment management provider, wherein the second circuit board in communication with the first circuit board is connected to the payment subsystem and the network interface, the instructions stored on a non-transitional readable medium being for further causing the processor to:
after computing of the volume of the liquid dispensed by the system into the target reservoir, at the first circuit board, compute a cost for the vending of the volume to the consumer considering a price per unit of volume for the dispensed liquid; and
at the second circuit board, send a message through the network interface towards the financial payment management provider comprising the cost for the vending of the volume to the consumer, wherein the instructions stored on the non-transitional readable medium are for further causing the processor to:
when the remaining volume crosses the predetermined threshold evaluated volume, send a message through the network interface to a remote refill management subsystem.

14. A method for measured dispending of a liquid from a system into a target reservoir external to the system, the method comprising:
executing instructions stored on a non-transitional readable medium at a processor module for:
upon receipt of a start-signal to start dispensing of the liquid into the target reservoir, opening a controllable valve, causing liquid to flow through oval gear flow meter providing a first pulse and a second pulse to the processor;
until receipt of a stop-signal to stop dispensing of the liquid into the target reservoir, computing a volume of the liquid dispensed into the target reservoir by counting the first pulse as a first count and by counting the second pulse as a second count, at least one of the first count and the second count being computed with an adjustable volume-per-count value to obtain the volume of liquid dispensed into the target reservoir, the adjustable volume-per-count value being set from characteristic of the oval gear flow meter; and
generating an error when a difference between the first count for the first pulse and the second count for the second pulse is, in absolute value, greater than a predetermined threshold, the predetermined threshold being set considering a target precision setting.

15. The method of claim 14, wherein executed in a stand-alone enclosure comprising the above ground reservoir.

16. The method of claim 14, wherein the metrologic computations of the volume of liquid dispensed into the target reservoir are performed at first circuit board and controlling of the controllable valve is performed at a second circuit board in communication with the first circuit board.

17. The method of claim 14, further comprising dispensing of the liquid into the target reservoir through a nozzle of a pipe subsystem.

18. The method of claim 17, further comprising receiving the start-signal from the nozzle and receiving the stop-signal from the nozzle.

19. The method of claim 17, further comprising auto-stopping the dispensing though the nozzle when air pressure from an air penetration hole reaches a threshold value, the air penetration hole being dimensioned for a flow rate between 1 liter per minute and 8 liters per minute.

20. The method of claim 19, wherein the air penetration hole is no larger than 1 mm.

21. The method of claim 14, further comprising vending a consumer the volume of liquid dispensed into the target reservoir via a payment subsystem.

22. The method of claim 21, further comprising:
receiving authorization of the vending of the volume to the consumer from a remote financial payment management provider
after computing of the volume of the liquid dispensed by the system into the target reservoir, computing a cost for the vending of the volume to the consumer considering a price per unit of volume for the dispensed liquid; and
sending a message towards the financial payment management provider comprising the cost for the vending of the volume to the consumer.

23. The method of claim 14, further comprising avoiding undue liquid displacement therein upon stopping of the dispensing of the liquid by providing a unidirectional valve.

24. The method of claim 14, further comprising:
evaluating a remaining volume in the above-ground reservoir; and
when the remaining volume is lower than or equal to a predetermined threshold evaluated volume, preventing subsequent operation of the system until the remaining volume above the predetermined threshold evaluated volume.

25. The method of claim 24, further comprising, when the remaining volume crosses the predetermined threshold evaluated volume during dispensing of the liquid into the target reservoir, completing the ongoing dispending before preventing the subsequent operation of the system.

26. The method of claim 24, further comprising, when the remaining volume crosses the predetermined threshold evaluated volume, sending a message to a remote refill management subsystem.

* * * * *